March 14, 1961 C. HENDERSON 2,974,769
VEHICLE TRANSMISSION SYSTEMS
Filed July 15, 1957
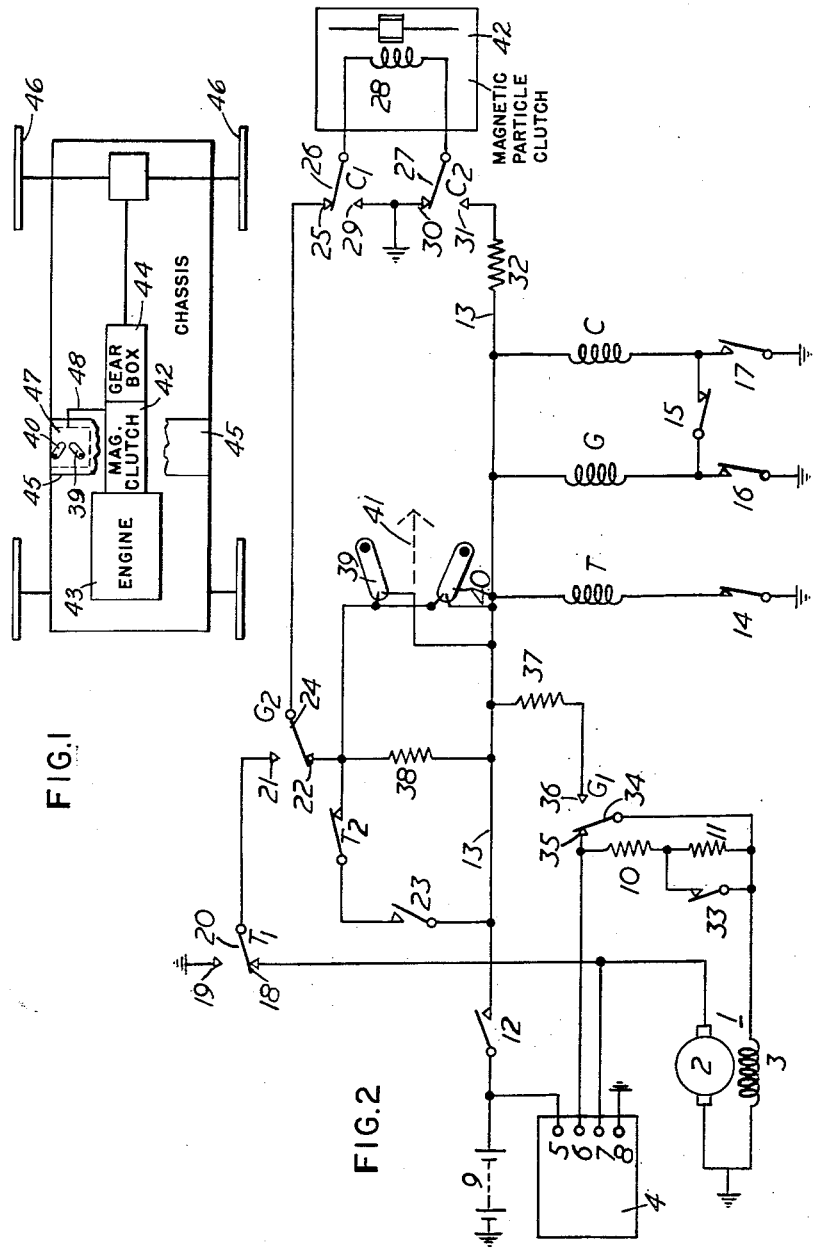
C. HENDERSON
Inventor
By Moore & Hall
Attorneys

United States Patent Office 2,974,769
Patented Mar. 14, 1961

2,974,769
VEHICLE TRANSMISSION SYSTEMS

Cyril Henderson, New Malden, England, assignor to Smiths America Corporation, Washington, D.C.

Filed July 15, 1957, Ser. No. 671,836
Claims priority, application Great Britain July 13, 1956
3 Claims. (Cl. 192—103)

The present invention relates to transmissions for vehicles of the kind in which power is transmitted from a power unit, for example an internal combustion engine, to the driving wheels through one or other of a plurality of gear trains and a clutch capable of slipping and of transmitting torque when in a slipping condition variable in accordance with the degree of energisation thereof.

In transmissions of this kind it is extremely undesirable for the clutch to be fully energised when there is a substantial difference between the speeds of the driving and driven members, as then a sudden jerk or lurch of the vehicle is produced. This state of affairs may occur most frequently if the engine is running at a speed below that corresponding to the vehicle speed for the particular gear ratio engaged, when full energisation of the clutch may give a decelerating torque equal to the slipping torque of the clutch when fully energised.

It is the object of the invention to provide means to ensure, in a transmission of the kind referred to, that the clutch is not fully engaged under such conditions as to apply a large decelerating torque to the transmission.

According to the present invention, in a transmission system of the kind referred to, we provide means responsive to the torque transmitted to the driving wheels to permit only partial energisation of the clutch unless the said torque exceeds some predetermined value in the sense corresponding to acceleration of the vehicle.

The means responsive to the transmitted torque may comprise a torque-measuring device associated with the usual vehicle propeller shaft. The use of such a device would however be inconvenient in many cases, and preferably the means responsive to transmitted torque comprise an acceleration-responsive device, mounted on the vehicle so as to be responsive to acceleration of the vehicle in the forward direction. Preferably two similar acceleration-responsive devices are provided, directed at equal acute angles to one side and the other of the forward direction, whereby a measure of compensation for the effects of centrifugal force during a turn of the vehicle may be achieved.

The acceleration responsive devices may conveniently consist of horizontally mounted tubes, each containing a globule of mercury and having a pair of contacts at its rear end, which are bridged by the mercury globule when the component of aceleration along the tube exceeds some predetermined low value.

An embodiment of the invention will now be described with respect to the accompanying drawings of which Figure 1 shows a schematic representation of a vehicle chassis and Figure 2 is a circuit diagram of an associated transmission control system.

Referring to Figure 2, a conventional dynamo 1, driven from the engine of the vehicle, has an armature 2 and field winding 3, one terminal of each of these being grounded. The ungrounded terminal of armature 2 is connected to terminal 7 of a conventional voltage regulator and cut out, indicated at 4. One terminal 5 of regulator 4 is connected to the ungrounded terminal of the usual battery 9, and a terminal 8 is connected to ground. Current for the dynamo field is supplied from terminal 6 of regulator 4, the regulator normally operating in a known manner to maintain the field current at such a value as to maintain the voltage at terminal 7 substantially constant (for sufficiently high engine speeds). Terminal 6 is connected through resistors 10 and 11 in series to the ungrounded terminal of winding 3. A choke switch 33 is connected in parallel with resistor 11. Flow of current from battery 9 is controlled by the usual ignition switch 12, current passing therethrough, when closed, to line 13. One terminal of a relay coil T is connected to line 13 and the other terminal is connected through a throttle switch 14 to ground. Relay coil T operates a change-over switch $T_1$ and an on-off switch $T_2$. Relay coils G and C each have one terminal connected to line 13. The other terminals of coils G and C are connected together through a neutral switch 15, and to ground through governor switch 16 and gear shift switch 17 respectively. Relay coil G operates change-over switches $G_1$ and $G_2$, and relay coil C operates change-over switches $C_1$ and $C_2$. One fixed contact 18 of switch $T_1$ is connected to terminal 7, and the other fixed contact 19 is grounded. The moving contact 20 is connected to a fixed contact 21 of switch $G_2$. The other fixed contact 22 of switch $G_2$ is connected through switch $T_2$, and a top gear switch 23 in series to line 13. Moving contact 24 of switch $G_2$ is connected to a fixed contact 25 of switch $C_1$. The moving contacts 26 and 27 of switches $C_1$ and $C_2$ respectively are connected to the terminals of a clutch-energising winding 28. Fixed contact 29 of switch $C_1$ is grounded, as is also fixed contact 30 of switch $C_2$. Fixed contact 31 of switch $C_2$ is connected through a resistor 32 to line 13. The moving contact 34 of switch $G_1$ is connected to the ungrounded terminal of winding 3, and a fixed contact 35 is connected to terminal 6 of regulator 4. The other fixed contact 36 is connected through a resistor 37 to line 13. A resistor 38 and mercury switches 39 and 40 are all connected in parallel between contact 22 and line 13.

Throttle switch 14 is actuated in accordance with movement of the usual engine throttle, and is made when the throttle is closed. When switch 14 is closed relay coil T is energised moving contact 20 of switch $T_1$ engages contact 19, and switch $T_2$ is opened. Governor switch 16 is actuated by a governor (not shown) of a conventional kind driven from the output shaft of the vehicle gear box. It is arranged that switch 16 is closed when the road speed of the vehicle is below approximately 10 m.p.h. When switch 16 is closed relay coil G is energized, moving contact 24 engages contact 21 and moving contact 34 engages contact 36. Gear shift switch 17 which may conveniently be of the kind shown in U.S. Patent No. 2,263,047, is installed in the root of the gear lever of the vehicle and is closed only when pressure is being exerted on the lever during a gear change. When switch 17 is closed relay coil C is energised, moving contact 26 engages contact 29 and moving contact 27 engages contact 31. Neutral switch 15 is actuated by the gear lever so that it is closed only when the transmission is in neutral. Choke switch 33 is actuated by the choke so that it is opened only when the choke is in operation. Top gear switch 23 is actuated by the gear lever so that it is closed only when the transmission is in top gear.

The clutch (indicated at 42) which has an energising winding 28 may be of any convenient form, but is preferably of the form in which torque is transmitted between driving and driven members through a mass of finely divided ferromagnetic particles subjected to a magnetic field controlled by the energising winding, such as is shown in U.S. Patent No. 2,575,360, i.e. a magnetic powder clutch. Clutch 42 couples the engine (indicated at 43) to a conventional synchromesh gear box (indicated at 44) which is, in turn, connected to the driving wheels (indicated at 46).

The mercury switches 39 and 40 each consist of a glass tube containing a globule of mercury with a pair of contacts sealed into the glass at one end. The contacts are at the rear end of each tube, and the arrangement is such that when the tube is unaccelerated the globule is clear of the contacts and when the tube is subjected to an appreciable acceleration along the tube the contacts are bridged. Switches 39 and 40 are mounted at any convenient place on the vehicle such as on the bulkhead 45 with their axes substantially horizontal and directed forwardly at angles of about 30° to one side and the other of a line parallel to the longitudinal axis of the vehicle (indicated by arrow 41 in Figure 2).

The mercury switches, the three relays and the resistors may conveniently be mounted together in the vehicle on a suitable chassis as shown in Figure 1 and indicated by the dotted square at 47. Circuit connection 48 supplies the clutch coil 28 in clutch 42.

The operation of the transmission will now be described. It should be stated that in the figure all the contacts are shown in the positions they assume when the vehicle is at rest, the ignition switch is open, the various coils are de-energised, and the throttle is closed.

When starting off from rest in a low gear the throttle is opened so that switch 14 is open. Governor switch 16 is made, and neutral switch 15 and gear shift switch 17 are open. Switches $T_1$, $T_2$, $C_1$, and $C_2$ are therefore in the positions shown in the figure, and moving contact 24 of switch $G_2$ is in engagement with contact 21 and moving contact 34 of switch $G_1$ is in engagement with contact 36. The clutch energising winding 28 is fed from the dynamo. The dynamo field winding 3 is fed partly through resistor 10 from terminal 6 of the regulator, and partly through resistor 37 from accumulator 9. This arrangement ensures that the dynamo output, and hence clutch energisation increases gradually with road speed at very low speeds. If the choke is in operation resistor 11 is placed in series with resistor 10 to cater for the increased engine idling speed.

When the speed exceeds about 10 m.p.h. governor switch 16 opens so that relay coil G is de-energised, moving contact 24 engages contact 22 and moving contact 34 engages contact 35. The clutch is now energised from the accumulator through mercury switches 39 and 40 or resistor 38 as will be explained later. The dynamo field winding 3 is also fed directly from terminal 6 of the regulator.

A gear shift commences with pressure being applied to the gear lever so that gear shift switch 17 is made and relay coil C energised. Moving contact 26 engages contact 29 and moving contact 27 engages contact 31 so that a small reverse current passes through the clutch winding 28 from resistor 32 to overcome the effects of remanence (thereby causing the clutch to release more rapidly). When the gear shift is completed gear shift switch 17 is opened and switches $C_1$ and $C_2$ return to their original position to re-energise the clutch. If the transmission is put into neutral below about 10 m.p.h. relay coil C is energised through switches 15 and 16 to free the clutch. If the throttle is closed when the vehicle is travelling below about 10 m.p.h. relay coil T is energised through switch 14, and moving contact 20 engages contact 19 which is earthed to slowly de-energize the clutch.

It will be seen that when the vehicle is accelerating in the forward direction, above 10 m.p.h. (implying of necessity that drive is being transmitted through the clutch to the driving wheels), at least one of the mercury switches will be closed, and the clutch will be energized through it from the accumulator. If the vehicle is not accelerating the mercury switches open, and the clutch is energised through resistor 38, which is such that the clutch slips at about one-third of the maximum engine torque. Hence full engagement of the clutch cannot occur in such conditions as to give rise to a decelerating jerk. Two mercury switches at an angle are used to ensure that when turning a corner at a more or less uniform speed a forwardly directed component of centrifugal force does not in normal circumstances cause partial de-energisation of the clutch, as may readily occur if a single device lying along the longitudinal axis is used. When the vehicle is running at high speed full torque may be required even though the vehicle is not accelerating (to overcome wind resistance etc.). Switch 23 is provided to deal with this situation by connecting contact 22 to line 13 through switch $T_2$ when the transmission is in top gear and the throttle open.

It will be appreciated that when ascending a gradient of substantial magnitude in an indirect gear at a uniform speed the force of gravity acting on the mercury of switches 39 and 40 will ensure that the clutch can be fully engaged.

To avoid freezing of the mercury in conditions of extreme cold, part at least of resistor 38 may be wound round the glass tubes.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. In a vehicle having an engine and driving wheels, a transmission system comprising a clutch through which torque is transmitted from the engine to the driving wheels, control means for the clutch controlling the engagement of the clutch, the said means having a first condition in which the clutch may be fully engaged and a second condition in which the clutch may be only partially engaged, first and second acceleration-responsive devices situated on the vehicle and each responsive to acceleration in a fixed direction, the fixed directions of the devices being horizontal with respect to the vehicle and at equal acute angles to one side and the other of the forward direction thereof, means operatively connecting the devices to the control means to place them in said second condition if the forward acceleration of both of the devices in their respective fixed directions falls below a predetermined low value and otherwise to place them in said first condition.

2. A transmission system as claimed in claim 1 wherein the first and second acceleration-responsive devices comprise first and second mercury switches.

3. A transmission system as claimed in claim 2 wherein the clutch is electrically energized by means of an energizing winding, and the control means comprise a source of electrical power, a resistor and circuit connecting elements connecting the source of power in series with both the resistor and the energizing winding, and said first and second mercury switches each in parallel with the resistor, whereby the control means are in said second condition when both the mercury switches are open and otherwise are in said first condition.

References Cited in the file of this patent

UNITED STATES PATENTS

| | | |
|---|---|---|
| 1,893,644 | Fleischel | Jan. 10, 1933 |
| 2,070,176 | Philips | Feb. 9, 1937 |
| 2,109,420 | Guernsey | Feb. 22, 1938 |
| 2,173,116 | Kliesrath | Sept. 19, 1939 |
| 2,225,315 | McCollum | Dec. 17, 1940 |
| 2,252,136 | Price | Aug. 12, 1941 |
| 2,255,389 | Lange | Sept. 9, 1941 |
| 2,302,005 | Caves | Nov. 17, 1942 |
| 2,762,476 | Gaylord et al. | Sept. 11, 1956 |

FOREIGN PATENTS

| | | |
|---|---|---|
| 185,243 | Austria | Apr. 10, 1956 |